E. G. CLYMANS & M. A. FLAUTT.
STRAW STACKER.
APPLICATION FILED JAN. 23, 1908.

901,882.

Patented Oct. 20, 1908.
6 SHEETS—SHEET 1.

WITNESSES:

INVENTORS
Ezra G. Clymans, and
Melvin A. Flautt
BY
Herbert W. Jenner.
Attorney

UNITED STATES PATENT OFFICE.

EZRA G. CLYMANS AND MELVIN A. FLAUTT, OF WAYNESBORO, PENNSYLVANIA, ASSIGNORS TO THE GEISER MANUFACTURING COMPANY, OF WAYNESBORO, PENNSYLVANIA.

STRAW-STACKER.

No. 901,882.  Specification of Letters Patent.  Patented Oct. 20, 1908.

Application filed January 23, 1908. Serial No. 412,301.

*To all whom it may concern:*

Be it known that we, EZRA G. CLYMANS and MELVIN A. FLAUTT, residing at Waynesboro, in the county of Franklin and State of Pennsylvania, have invented certain new and useful Improvements in Straw-Stackers; and we do hereby declare the following to be a full, clear, and exact description of the invention, such as will enable others skilled in the art to which it appertains to make and use the same.

This invention relates to straw-stackers adapted for attachment to threshing-machines and specially adapted for use in barns; and it consists in the novel construction and combination of the parts hereinafter fully described and claimed, whereby the straw is deposited in different places in the barn without moving the threshing-machine.

A is the rear end portion of the casing of a threshing-machine or grain-separator of any approved construction.

B is the stationary supporting frame of the straw-stacker formed of longitudinal side-pieces and suitable crossbars. The front ends of the side-pieces of the frame B are provided with two similar brackets $b$, and have suitable fastening devices for securing the brackets to the longitudinal members of the casing A.

C are two similar inclined braces provided with screwthreaded portions and turnbuckles $c$, for connecting the middle parts of the frame B with the upper part of the casing A.

D is an annular metallic turntable secured to the frame B, and having filling pieces $d$ interposed between it and the said frame. The turnbuckles enable the frame B to be braced up so that the turntable is supported in a horizontal plane.

E is a revoluble frame formed of two side-bars, and cross-pieces $d^2$ and $d'$. The cross-pieces $d^2$ are arranged between the middle portions of the side-bars, and they support the platform planks $e$ which prevent the carrier from sagging. The cross-pieces $d'$ are arranged at the lower edges of the side-bars, and they have longitudinal planks E' secured to them. These planks E' have suitable metallic wearing plates (not shown) on their lower surfaces which rest on the metallic turntable D.

Figure 8:
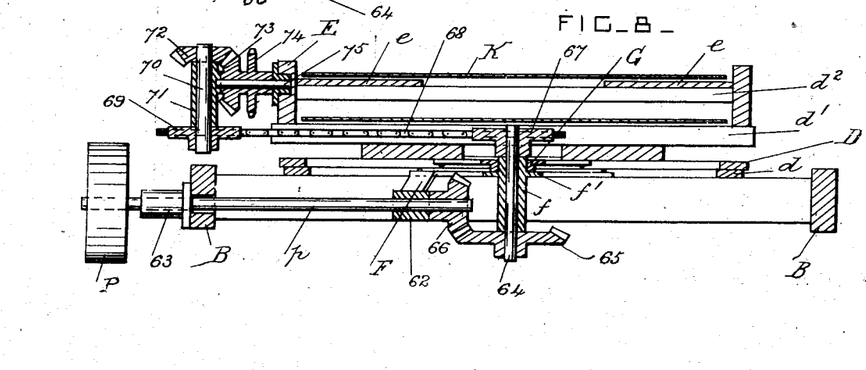
Fig. 8 is a cross-section, taken on the line $x$—$x$ in Fig. 3.

F is a bracket secured to the stationary frame B, as shown in Fig. 8, and this bracket is provided with a center bearing $f$ having a collar $f'$.

G is an annular bearing-plate which is secured to the longitudinal planks E' and which is journaled on the upper end portion of the bearing $f$ and which rests on the collar $f'$.

The bracket F is rigidly secured to the longitudinal frame B, and the frame E may be oscillated or revolved upon its collar $f'$ and the said turntable D.

Figures 9, 10:
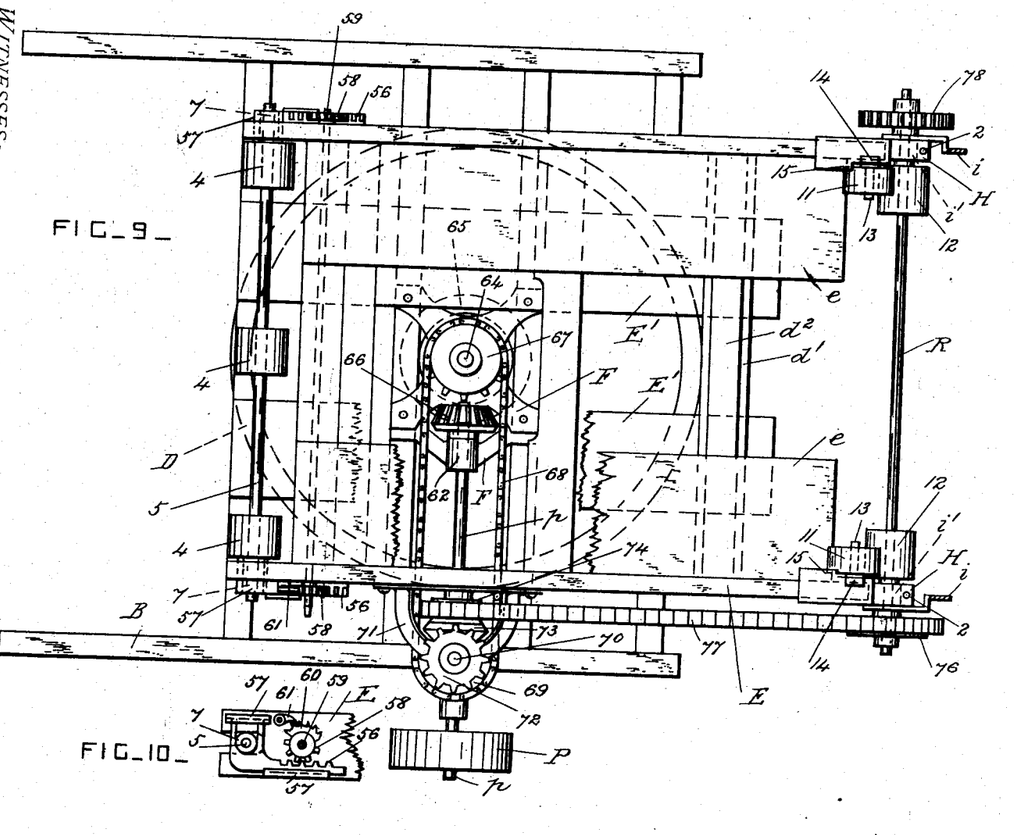
Fig. 9 is a plan view of the turntable and revoluble frame at the lower part of the stacker.
Fig. 10 is a detail side view of a portion of the tightener for the lower straw carrier.
Figure 15:
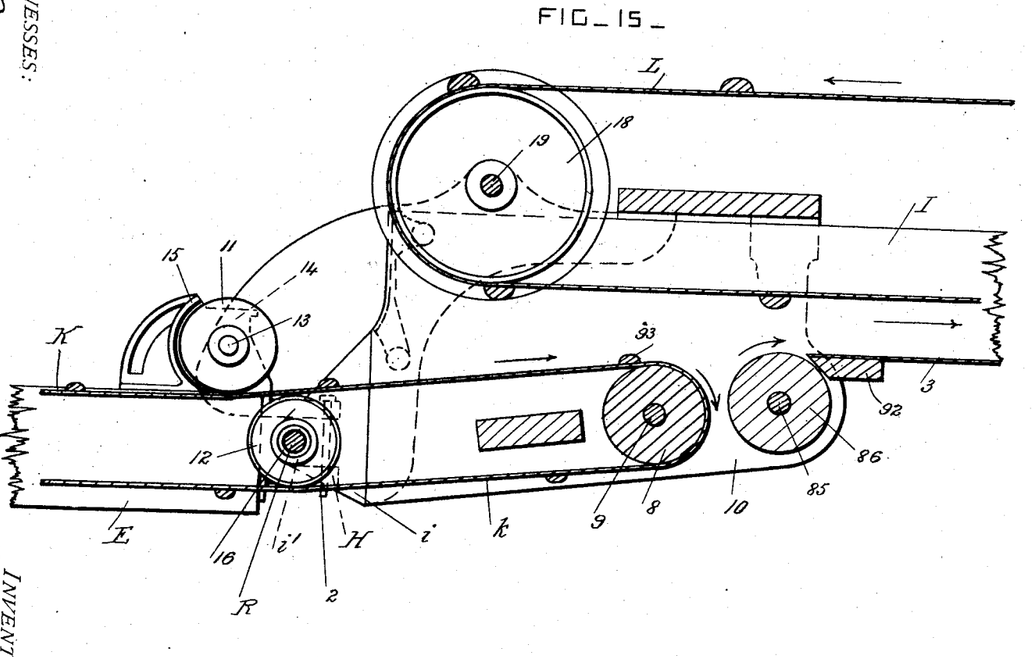
Fig. 15 is a section taken on the line $y$—$y$ in Fig. 11, showing the pivotal connection of the lower conveyer with the elevator, and drawn to a larger scale.

H are forked bearings secured to the rear ends of the side-bars of the revoluble frame E. The frame of the straw-elevator is formed of a lower section I and an upper section J. These two sections are pivotally connected together by suitable hinges $j$. The lower end portion of the lower section I is provided with brackets $i$ having tubular pivots $i'$ which are pivoted in the forked bearings H. Pins 2, shown in Figs. 9 and 15, are provided to retain the tubular pivots in the said brackets.

The sections I and J are trough-shaped in cross-section, and they have metallic bottom plates 3.

Figure 11:
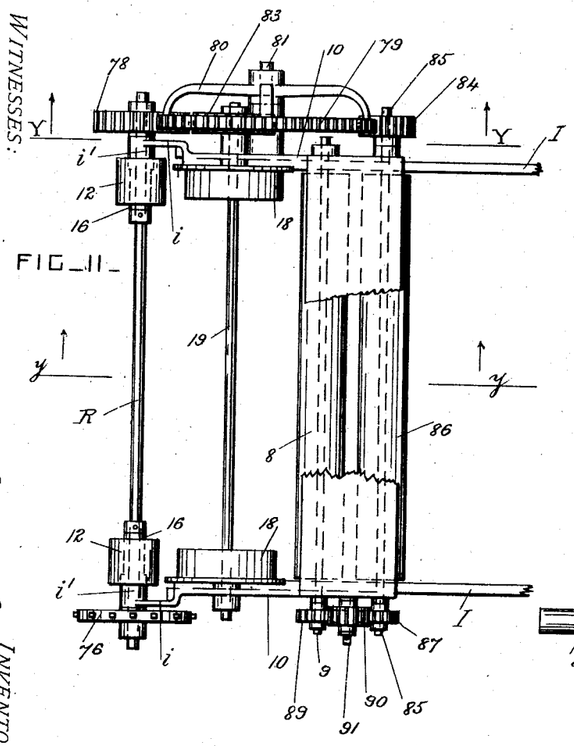
Fig. 11 is a plan view of the devices for driving the elevator.

K is the carrier of the horizontal conveyer and it is formed of an endless band of canvas or other suitable material. The front end of this carrier is supported by pulleys 4 secured upon a shaft 5 which is journaled in bearings 7 carried by the frame E. The rear end of the carrier K passes over a roller 8 secured on a shaft 9 which is journaled in side-plates 10 secured to the lower part of the elevator section I. The rear part $k$ of the carrier K is bent upwardly at an obtuse angle to its main or horizontal portion. Guide pulleys 11 and 12 are provided for the carrier K. The guide pulleys 11 are arranged above the upper bight of the carrier K, and are journaled on pins 13 which project laterally from brackets 14 which are secured to the side-bars of the frame E. Guards 15 are provided on the brackets 14 to prevent straw from obstructing the pulleys 11. The guide pulleys 12 are arranged above the lower bight of the carrier K, and they are journaled on prolongations 16 of the tubular pivots $i'$, as shown in Figs. 11 and 15.

Figures 1, 2:
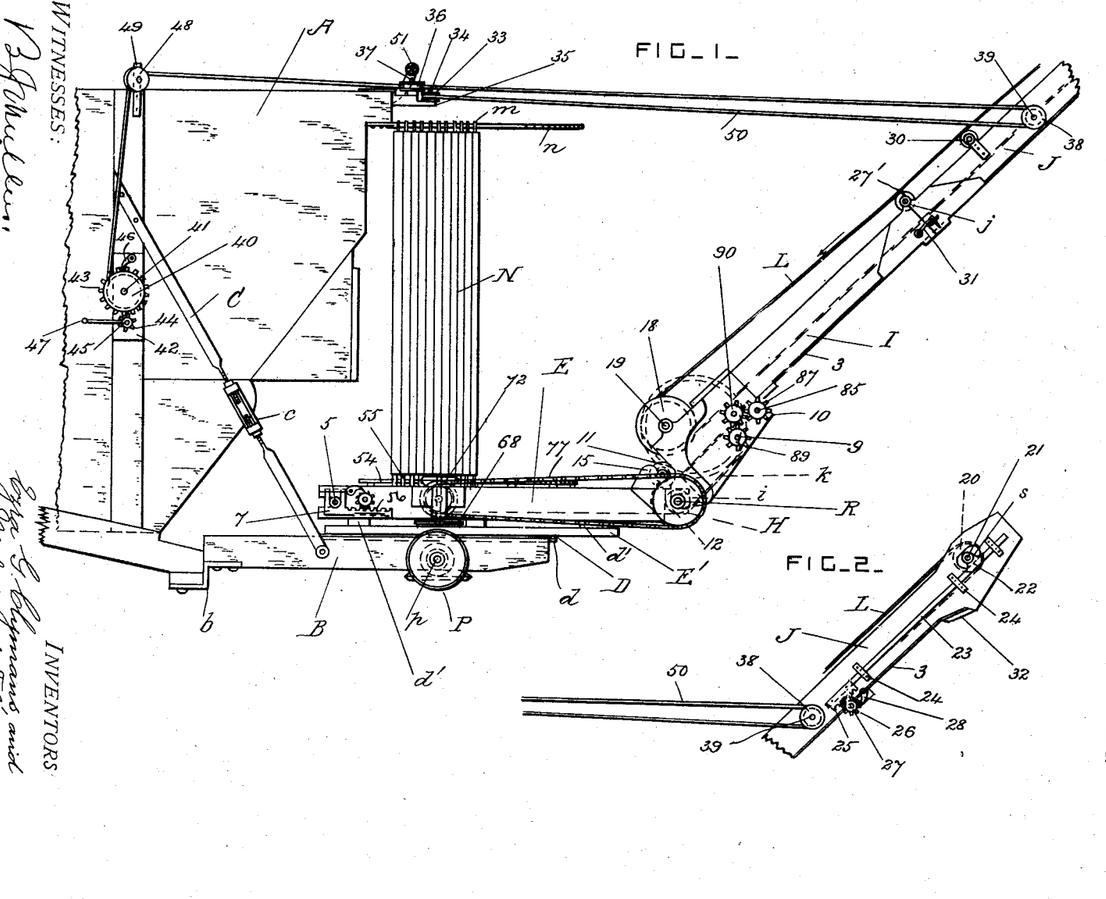
Figure 1 is a side view of the rear end portion of the casing of a threshing-machine showing the straw-stacker attached to it.
Fig. 2 is a side view of the upper end portion of the straw-stacker which could not be included in Fig. 1.
Figure 3:
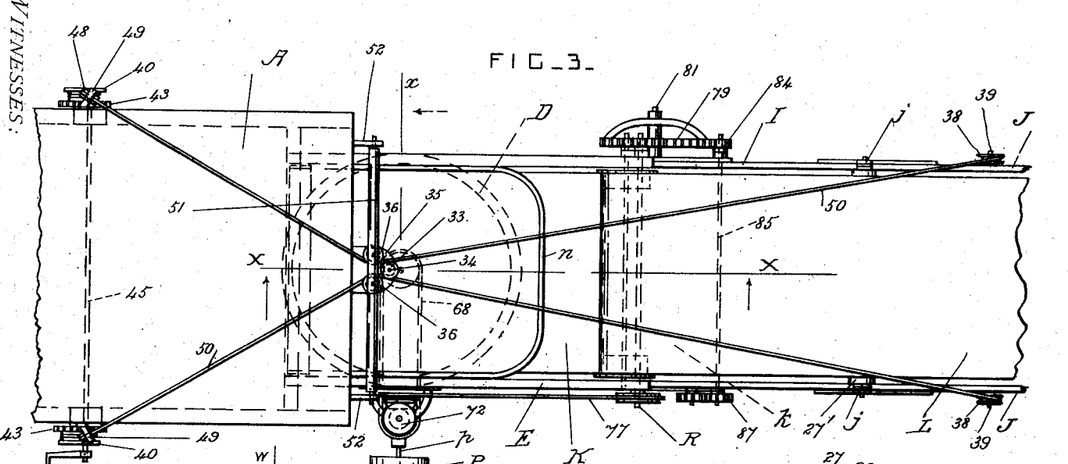
Fig. 3 is a plan view of the parts shown in Fig. 1.
Figure 4:
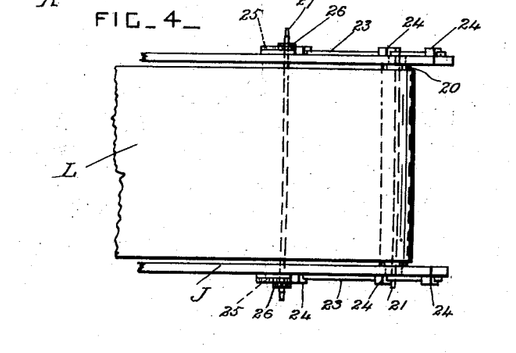
Fig. 4 is a plan view of the parts shown in Fig. 2.

The straw elevator is provided with an endless carrier L, and the carriers K and L are driven in the direction of the arrows placed adjacent to them on the drawings. The lower end portion of the carrier L is supported and driven by pulleys 18 secured upon a shaft 19 which is journaled in bearings on the side-plates 10. The upper end portion of the carrier L is supported by a roller 20 provided with a shaft 21, as shown in Figs. 2 and 4. The shaft 21 passes through holes or slots $s$ in the sides of the section J, and is journaled in bearings 22 secured to bars 23. The bars 23 are slidable in guides 24, longitudinally of the section J, and they are provided with toothed racks 25 on their lower ends. Toothed pinions 26 are secured on a shaft 27 which is journaled crosswise of the elevator section J in suitable bearings, and these pinions gear into the racks 25.

The shaft 27 has square ends so that it can be revolved by means of a suitable handle to adjust the tension of the carrier L, and 28 is a pivoted check pawl which engages with one of the pinions 26 and normally prevents the shaft 27 from turning backward.

A guide roller 27' is provided at the hinge $j$ for supporting the upper bight of the carrier L, and 30 is a second roller carried by the elevator section J which prevents the upper bight from sagging between the rollers 27' and 20. The hinges $j$ of the elevator sections are provided with hooks 31, or other approved fastening devices, for holding the said sections in line with each other. A crosspiece 32 is arranged at the upper end of the bottom plate 3 of the section J, and this crosspiece and the end portion of the plate 3, which is secured over it, are arranged at an angle to the main portion of the bottom plate 3 so that the straw is discharged freely over the crosspiece 32, and so that the cross-slats of the carrier L will not catch the upper edge of the bottom plate 3 should the carrier ever be driven in the wrong direction accidentally. The straw is elevated between the lower bight of the carrier L and the bottom plates 3.

A tackle is provided for supporting the straw elevator and adjusting its angle.

A sheave 33 is journaled on a pin 34 carried by a bracket 35 at the rear and middle part of the top of the thresher casing A, and the center of the pin 34 is arranged on the longitudinal center line of the threshing-machine and turntable, and a little in front of the vertical axis of the turntable. Guide sheaves 36 are journaled on pins 37 which project from the bracket 35, one on each side of the sheave 33. Guide sheaves 38 are journaled on pins 39 which project from the elevator section J.

Winding drums 40 are journaled on pins 41 carried by brackets 42 which are secured to the sides of the casing A, and 43 are toothed wheels on the said drums. Toothed pinions 44 are secured on a shaft 45 which passes through the casing A and is journaled in the brackets 42. The pinions 44 are arranged in gear with the wheels 43. A check pawl 46 is provided for preventing the reverse motion of the barrels, and 47 is a handle for revolving the shaft 45. Guide sheaves 48 are journaled in brackets 49 secured at the top of the casing A over the drums 40, and these sheaves are set at an angle to the center line of the machine.

A flexible connection or cord 50 is provided and its middle part is looped over the sheave 33. The end portions of this cord are carried over the sheaves 38, 36 and 48 in succession, and are wound upon the drums 40.

A roller 51 is journaled in bearings 52, and is arranged over the sheaves 36. When the straw-stacker is not in use, the section I is raised up, and the section J is turned over onto the top of the threshing machine casing A. The roller 51 then supports the section J, and prevents the bights of the cord 50 from leaving the guide sheaves and becoming entangled.

Figures 5, 6:
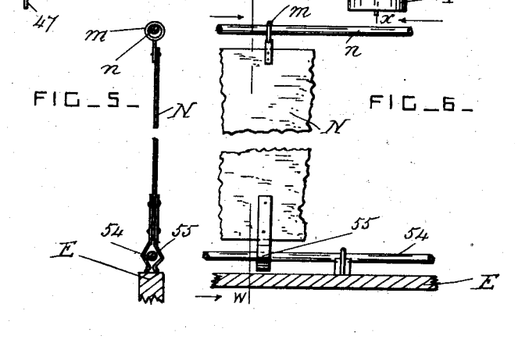
Fig. 5 is a section through one of the curtains and its supports, taken on the line $w$—$w$ in Fig. 6.
Fig. 6 is a detail side view of a portion of one of the curtains.
Figure 7:
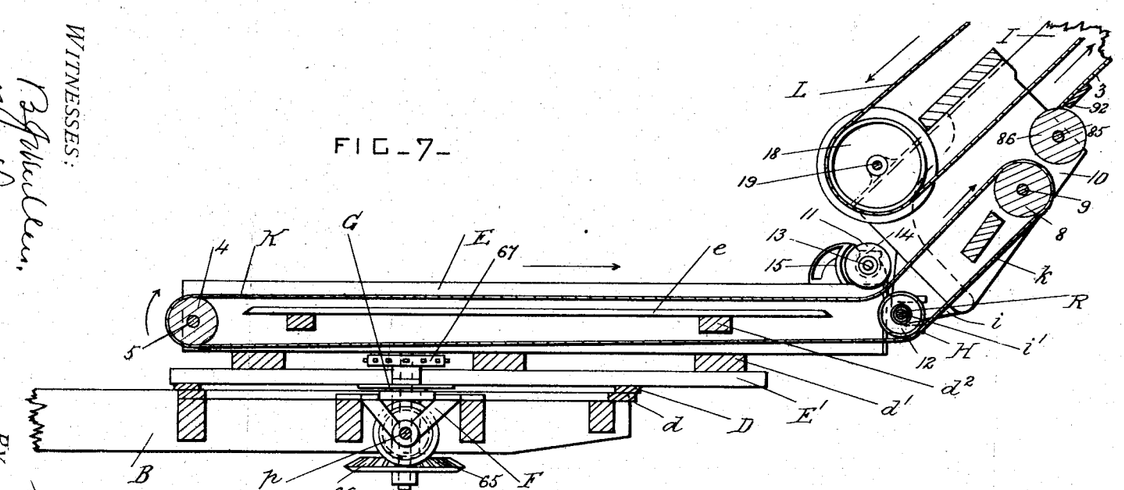
Fig. 7 is a longitudinal section through the lower part of the stacker, taken on the line X—X in Fig. 3 and drawn to a larger scale.

The straw is discharged from the casing A between two similar curtains N of canvas or other flexible material. These curtains are suspended by slidable rings $m$ from a loop-shaped guide $n$ secured to the upper part of the casing A. A guide-bar 54 is secured by suitable supports to the side-bars of the revoluble frame E, as shown in Figs. 5 and 6. Spring-clips 55 are secured to the bottom edges of the curtains, and slide upon the guide-bar 54. These clips are automatically disengageable from the bar 54 when the frame E is swung around without first adjusting the curtains in a suitable manner. This prevents the curtains from being accidentally torn away and the supports from being bent or broken, and the connection of the lower edges of the curtains with the frame E prevents straw from being thrown out at the sides of the frame E.

The tension of the carrier K is adjusted as shown in Figs. 9 and 10. The bearings 7 of the shaft 5 are provided with toothed racks 56, and are slidable in guides 57 carried by the frame E. Toothed pinions 58 are secured on a shaft 59, and are arranged in gear with the racks 56. The shaft 59 is journaled in the frame E, and is provided with a square end for the attachment of an operating handle. One of the pinions 58 is provided with a ratchet toothed segment 60, and 61 is a check pawl which engages with the said segment, and prevents the reverse movement of the shaft and pinions.

The straw-stacker is driven from any approved motor by a belt pulley P secured on a shaft p. This shaft is journaled in a bearing 62 on the bracket F, as shown in Fig. 8, and in a bearing 63 secured to the stationary frame B.

A vertical shaft 64 is journaled in the aforesaid bearing f at the center of the turntable, and has a beveled toothed wheel 65 secured on its lower end portion, which gears into a beveled toothed wheel 66 secured on the shaft p.

A sprocket wheel 67 is secured to the upper end portion of the vertical shaft 64, and 68 is a drive-chain which passes over the wheel 67, and over a sprocket-wheel 69. The sprocket-wheel 69 is secured on the lower end portion of a vertical shaft 70, which is journaled in a bracket 71 secured to one side of the revoluble frame E, as shown in Figs. 8 and 9. A beveled toothed wheel 72 is secured to the upper end portion of the shaft 70, and gears into a beveled toothed wheel 73. The wheel 73 has a sprocket-wheel 74 rigidly secured to it, and these two wheels are journaled on a horizontal shaft 75 carried by the frame E and the bracket 71.

Figure 12:
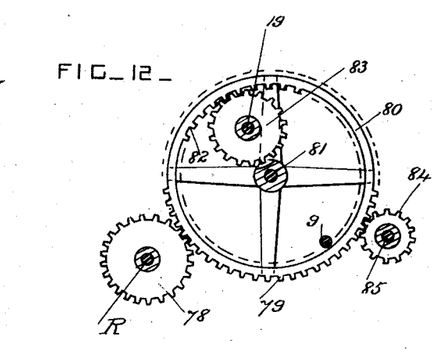
Fig. 12 is a detail view of some of the driving wheels, and is taken on the line Y—Y in section in Fig. 11 and looking in the direction of the arrows.

R is a shaft which is journaled in the tubular pivots i', hereinbefore described, which are supported at the rear end of the frame E. A sprocket-wheel 76 is secured on one end portion of the shaft R, and 77 is a drive-chain which passes over the said wheels 74 and 76, as shown in Figs. 1 and 9. A toothed driving wheel 78 is secured on the other end portion of the shaft R, as shown in Figs. 9, 11 and 12.

The wheel 78 gears into the external teeth 79 of a wheel 80, which is journaled on a pin 81 which projects laterally from one of the side-plates 10. This wheel 80 is also provided with internal teeth 82 which gear into a toothed wheel 83 secured on the shaft 19 hereinbefore described, and which drives the pulleys 18 of the carrier L. The external teeth 79 also gear into a small toothed wheel 84 secured on a shaft 85, which is also journaled in the side-plates 10. A roller 86 is secured on the shaft 85 and it arranged adjacent to the roller 8, hereinbefore described, as shown in Figs. 11 and 15. The roller 86 is arranged a little above and to the rear of the roller 8. A toothed pinion 87 is secured on the other end portion of the shaft 85 from the wheel 84, and a toothed pinion 89 is secured on the adjacent end portion of the shaft 9. An idle toothed wheel 90 is journaled on a pin 91 which projects from one of the side-plates 10, and this pinion 90 gears into the two pinions 87 and 89, so that the two rollers 86 and 8 are revolved in the same direction. A stiffening-plate 92 is arranged at the bottom of the section I close to the roller 86 so that no straw can escape at this point.

Figures 13, 14:
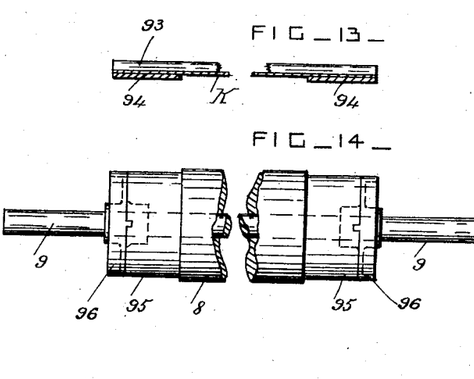
Fig. 13 is a detail cross-section through one of the straw carriers.
Fig. 14 is a detail view of one of the rollers shown in Fig. 11.

The carrier K has slats 93 on it, and strengthening bands 94 are secured to its lower edges, as shown in Fig. 13. The roller 8, and other rollers over which the carrier K passes, have reduced end portions 95, as shown in Fig. 14, to accommodate the bands 94, and these rollers are preferably formed of wooden segments secured together and provided with metallic heads 96 at their ends, which are secured to the roller shafts.

The carriers are driven by the motor and the hereinbefore described driving devices in the directions of the arrows adjacent to them, and the straw-stacker is slewed around and adjusted to any desired angle by hand.

The straw is discharged from the rear end of the threshing-machine, and it falls between the curtains onto the carrier K, and is carried rearwardly between the guide pulleys 11, and is delivered between the lower bight of the carrier L and the bottom plate 3 of the straw elevator. The roller 86 is positively driven, as hereinbefore described, and it prevents the straw from being carried downwardly by the carrier K as it passes over the roller 8, and permits a small space being formed at this point between the rollers, for the passage of the slats 93. The straw is carried up the elevator over the bottom plates 3, and is discharged over the crosspiece 32 at the upper end of the elevator.

What we claim is:

1. The combination, with a threshing-machine casing, of a conveyer-frame pivotally supported from the said casing and movable in a horizontal plane, an upper guide secured to the said casing, a curtain carried by the said upper guide, a lower guide secured to the said conveyer frame, and detachable spring-clips slidable on the said lower guide and normally connecting the lower part of the said curtain with it.

2. The combination, with a threshing-machine casing, of a stationary frame secured to the said casing, a revoluble frame mounted on the said stationary frame, a straw-conveyer carried by the said revoluble frame, an upper guide carried by the said casing, curtains suspended from the said guide, a lower guide carried by the said revoluble frame, and spring-clips connecting the lower parts of the said curtains with the said lower guide.

3. The combination, with a threshing-machine casing, of a straw-stacker carried by the said casing and pivoted to swing horizontally and provided with a straw-elevator, a center guide-sheave mounted over the pivot of the straw-stacker at the top of the said casing, two guide-sheaves mounted one on each side of the said center sheave, two guide-sheaves mounted one on each side of the said elevator, windlasses arranged at the sides of the said casing, two guide-sheaves mounted on the said casing above the said windlasses, and a flexible connection having its middle part looped around the said center guide-sheave and its ends connected to the said windlasses, the intervening portions of the said flexible connection being carried by the said guide-sheaves, substantially as set forth.

4. The combination, with a threshing-machine casing, of a straw-stacker carried by the said casing and pivoted to swing horizontally and provided with a straw-elevator formed of foldable sections, a center guide-sheave mounted over the pivot of the straw-stacker at the top of the said casing, two guide-sheaves mounted one on each side of the said center guide-sheave, a roller supported from the said casing over the said two guide-sheaves, two guide sheaves mounted one on each side of the upper section of the said elevator, two guide-sheaves mounted at the sides of the said casing, windlasses arranged at the sides of the said casing below the last said guide-sheaves and operatively connected together, and a flexible connection having its middle part looped around the said center guide-sheave and its ends connected to the said windlasses, the intervening portions of the said flexible connection being carried by the said guide-sheaves, substantially as set forth.

5. In a straw-stacker, the combination, with a stationary supporting frame, a turntable-ring secured to the said frame, and a central bearing also secured to the said frame and provided with a collar; of a revoluble straw-conveyer frame, two longitudinal planks secured to the underside of the said revoluble frame one on each side of the said central bearing with their end portions projecting over the said turntable-ring and preventing the revoluble frame from tilting, and an annular bearing-plate journaled on the said central bearing and resting on its said collar, said bearing-plate being secured to the middle portions of the said longitudinal planks and supporting the said revoluble frame pivotally.

6. In a straw-stacker, the combination, with a stationary supporting frame provided with a tubular center bearing, of a revoluble frame mounted on the said stationary frame and engaging with the said bearing, a straw-conveyer carried by the said revoluble frame and provided with a driving shaft at its rear end, driving mechanism for revolving the said shaft provided with a sprocket wheel also arranged at the rear end of the said revoluble frame, a vertical driving shaft provided with means for revolving it and journaled in the said center bearing, a bracket secured to one side of the said revoluble frame, a vertical countershaft journaled in the said bracket, two sprocket-wheels secured respectively to the lower part of the said vertical countershaft and to the upper part of the said vertical driving shaft, a drive-chain passing over the said two sprocket-wheels, a horizontal countershaft carried by the said revoluble frame, beveled toothed wheels carried by the two said countershafts, a sprocket-wheel driven by the said beveled toothed wheels, and a drive-chain passing over the last said sprocket-wheel and over the said sprocket-wheel at the rear end of the revoluble frame.

7. In a straw-stacker, the combination, with a substantially horizontal straw-conveyer frame, of an inclined straw-elevator frame pivotally supported from the said conveyer frame, an inclined endless elevator carrier working in the said elevator frame, an endless conveyer carrier having a substantially horizontal main portion and an upwardly and rearwardly inclined rear end portion which projects above and behind the lowest portion of the said inclined elevator carrier, a roller for the rear end of the said conveyer carrier journaled in the pivoted straw-elevator frame, a support for the front end of the said conveyer journaled in the front end portion of the conveyer frame, a guide for the lower bight of the conveyer carrier journaled at the pivoted end portions of the said frames, and a pair of guide sheaves for the upper bight of the said conveyer carrier journaled adjacent to the said guide.

8. In a straw-stacker, the combination, with a substantially horizontally straw-conveyer frame, of an inclined straw-elevator provided with an endless carrier and pivoted to the rear end portion of the said frame, an endless straw-conveyer-carrier having a substantially horizontal main portion and an inclined rear end portion which projects above and behind the lowest portion of the said elevator carrier and delivers the straw against its lower side, and supporting devices for the said conveyer carrier journaled in the said frames and permitting the inclined portion of the said conveyer carrier to move pivotally with the said inclined elevator.

9. In a straw-stacker, the combination, with a straw-conveyer frame, of a straw-elevator frame pivoted to the rear end of the said conveyer frame and provided with means for supporting it at an angle, an endless elevator carrier supported in the said elevator frame, a driving roller journaled in the said elevator frame above and behind the lowest portion of the said elevator carrier and provided with means for revolving it, guide-pulleys carried by the front and rear end portions of the said conveyer frame, and an endless conveyer carrier having a substantially horizontal main portion carried by the said guide pulleys and having its rear end portion arranged at an angle to its main portion and passing over the said driving roller.

10. In a straw-stacker, the combination, with a straw-conveyer frame, of bearings secured to the rear ends of the said frame, a straw-elevator frame provided with tubular pivots at its lower end journaled in the said bearings, a driving shaft journaled in the said tubular pivots and provided with means for revolving it, means for supporting the said elevator frame at an angle, an endless elevator carrier supported in the said elevator frame, a driving roller journaled in the said elevator frame under the lower end portion of the said elevator carrier, driving devices operatively connecting the said roller with the said driving shaft, guide-pulleys carried by the front and rear end portions of the said conveyer frame, and an endless conveyer carrier having its main portion carried by the said guide pulleys and having its rear end portion arranged at an angle to its main portion and passing over the said driving roller.

11. In a straw-stacker, the combination, with a straw-conveyer frame, of a straw-elevator frame pivoted to the rear end of the said conveyer frame and provided with means for supporting it at an angle, an endless elevator carrier supported in the said elevator frame, an endless conveyer carrier having its rear end portion arranged at an angle to its main portion under the lower end portion of the said elevator carrier, means for guiding and driving the said conveyer carrier, a delivery roller journaled in the said elevator frame adjacent to the discharge end of the said conveyer carrier, and driving devices for revolving the said delivery roller in the same direction as the said conveyer carrier.

12. In a straw-stacker, the combination, with an endless carrier provided with reinforcing belts under its edges, of a wooden roller for supporting the said carrier provided with metallic caps at its ends, said caps and the end portions of the roller being of less diameter than the main portion of the roller to accommodate the said belts.

13. In a straw-stacker, the combination, with a straw-conveyer frame, of a straw-elevator frame pivoted to the rear end of the said conveyer frame, a driving shaft journaled in the pivots of the said elevator frame and provided with means for revolving it, an endless elevator carrier, a driving shaft journaled in the lower part of the said elevator frame and provided with means for driving the said elevator carrier, two toothed driving wheels secured on the end portions of the two said driving shafts, and a revoluble wheel supported by the said elevator frame and provided with external teeth and with internal teeth which gear into the two said toothed wheels respectively.

14. In a straw-stacker, the combination, with a straw-conveyer frame, of a straw-elevator frame pivoted to the rear end of the said conveyer frame, a driving shaft journaled in the pivots of the said elevator frame and provided with means for revolving it, an endless elevator carrier, a driving shaft journaled in the lower part of the said elevator frame and provided with means for driving the said elevator carrier, two toothed driving wheels secured on the end portions of the two said driving shafts, a revoluble wheel supported by the said elevator frame and provided with external teeth and with internal teeth which gear into the two said toothed wheels respectively, an endless conveyer carrier having its rear end arranged at an angle to its main portion, guide-pulleys for supporting the main portion of the said conveyer carrier in the said conveyer frame, a driving roller engaging with the rear end portion of the said conveyer carrier and journaled in the said elevator frame, and intermediate driving mechanism for revolving the said driving roller from the external teeth of the said revoluble wheel.

In testimony whereof we affix our signatures, in presence of two witnesses.

EZRA G. CLYMANS.
MELVIN A. FLAUTT.

Witnesses:
  GEO. H. RUSSELL,
  ALF. N. RUSSELL.